(12) United States Patent
Pathak

(10) Patent No.: US 11,569,663 B1
(45) Date of Patent: Jan. 31, 2023

(54) INTEGRATED CARBON-NEGATIVE, ENERGY GENERATION AND STORAGE SYSTEM

(71) Applicant: Manas Pathak, Chandler, AZ (US)

(72) Inventor: Manas Pathak, Chandler, AZ (US)

( * ) Notice: Subject to any disclaimer, the term of this patent is extended or adjusted under 35 U.S.C. 154(b) by 0 days.

(21) Appl. No.: 17/471,023

(22) Filed: Sep. 9, 2021

Related U.S. Application Data

(60) Provisional application No. 63/093,177, filed on Oct. 17, 2020.

(51) Int. Cl.
*F02C 6/16* (2006.01)
*H02J 3/38* (2006.01)
*F03D 9/11* (2016.01)

(52) U.S. Cl.
CPC ............... *H02J 3/381* (2013.01); *F02C 6/16* (2013.01); *F03D 9/11* (2016.05); *H02J 2300/22* (2020.01); *H02J 2300/28* (2020.01)

(58) Field of Classification Search
CPC .... H02J 3/381; H02J 2300/28; H02J 2300/22; F03D 9/11; F02C 6/16
See application file for complete search history.

(56) References Cited

U.S. PATENT DOCUMENTS

| | | | | |
|---|---|---|---|---|
| 9,014,791 B2* | 4/2015 | Held | ........................ | F02C 3/34 600/476 |
| 9,482,109 B2* | 11/2016 | de Chabris | ........... | H02J 15/006 |
| 2010/0326076 A1* | 12/2010 | Ast | ........................ | F01K 25/10 60/671 |
| 2015/0059350 A1* | 3/2015 | Kolvick | ................. | G05B 15/02 60/39.52 |
| 2015/0184590 A1* | 7/2015 | Conlon | ................... | F25J 1/0012 60/772 |
| 2015/0377076 A1* | 12/2015 | Giegel | .................... | F01K 25/08 60/645 |
| 2017/0211550 A1* | 7/2017 | Jiang | ........................ | F02G 1/05 |

* cited by examiner

*Primary Examiner* — Shafiq Mian
(74) *Attorney, Agent, or Firm* — Plager Schak LLP; Mark H. Plager; Alexis J. Saenz

(57) ABSTRACT

A system and method provide integrated carbon-negative, geothermal-based, energy generation and storage. The embodiments produce dispatchable electricity at grid-scale by storing excess energy from the grid and generating its own energy. The excess energy may be taken from solar and wind sources. In one aspect, the subject technology is energy storage, energy generation, carbon utilization and sequestration, all in one. The technology has very high round-trip efficiency of storing energy and is carbon-negative which makes it far more sustainable than any competing energy storage technology.

9 Claims, 3 Drawing Sheets

INTEGRATED CARBON-NEGATIVE, ENERGY GENERATION AND STORAGE SYSTEM

CROSS-REFERENCE TO RELATED APPLICATIONS

This application claims benefit to U.S. Provisional Patent Application 63/093,177, entitled "Combined closed loop geothermal and mechanical pumped hydro," filed on Oct. 17, 2020. The U.S. Provisional Patent Application 63/093,177 is incorporated herein by reference.

BACKGROUND

The embodiments described herein relate generally to energy systems, and more particularly, to an integrated carbon-negative, scalable, modular, energy generation and storage system.

Well known energy generation systems include hydro-electric, solar, and wind powered systems. Energy from these systems is commonly generated dependent on the amount of natural energy source available. The amount of energy available can be intermittent as the availability of the natural source rises and decreases at any given time. There is an absence of economically feasible, working or commercial grid-scale energy storage solutions for when excess energy is available from wind and solar and use it when renewable energy generation from solar and wind is low for short to long durations.

As will be appreciated, aspects of the subject technology address the need for energy storage to address the intermittency of natural energy sources such as solar and wind energy technologies. Embodiments of the subject technology propose to solve a few problems: (a) short duration storage allows grid operators to balance the consumption and generation despite the intermittent energy feed from renewables, thereby relying less on traditional gas or coal-based power plants. (b) The long duration storage (10+ hours) allows grid operators to avoid blackouts without relying on fossil fuels, when solar and/or wind energy generation have not been enough in consecutive days.

SUMMARY

In one aspect of the disclosure, a method is disclosed. The method includes compressing a primary fluid. The compressed primary fluid is injected into a subsurface reservoir (geothermal or traditional porous rock) or on-the-surface heated-pressurized system. A release of the compressed primary fluid from the reservoir is controlled. The released compressed primary fluid is circulated into a first turbine system. Electricity is produced by an operation of the first turbine system through mechanical to electrical energy using a turbine similar to hydro-electric turbine. The compressed primary fluid is circulated out of the first turbine system and into a second turbine where the turbine moves due to isentropic expansion of the fluid. Next, the primary fluid is circulated into a heat exchanger where heat is captured by a secondary fluid as the primary fluid is passed through the heat exchanger. A third turbine outside the closed loop of primary fluid produces additional electricity by binary cycle. This electricity is produced by rotating turbine due to expansion of the secondary fluid that captured the heat from the primary fluid through the heat exchanger.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
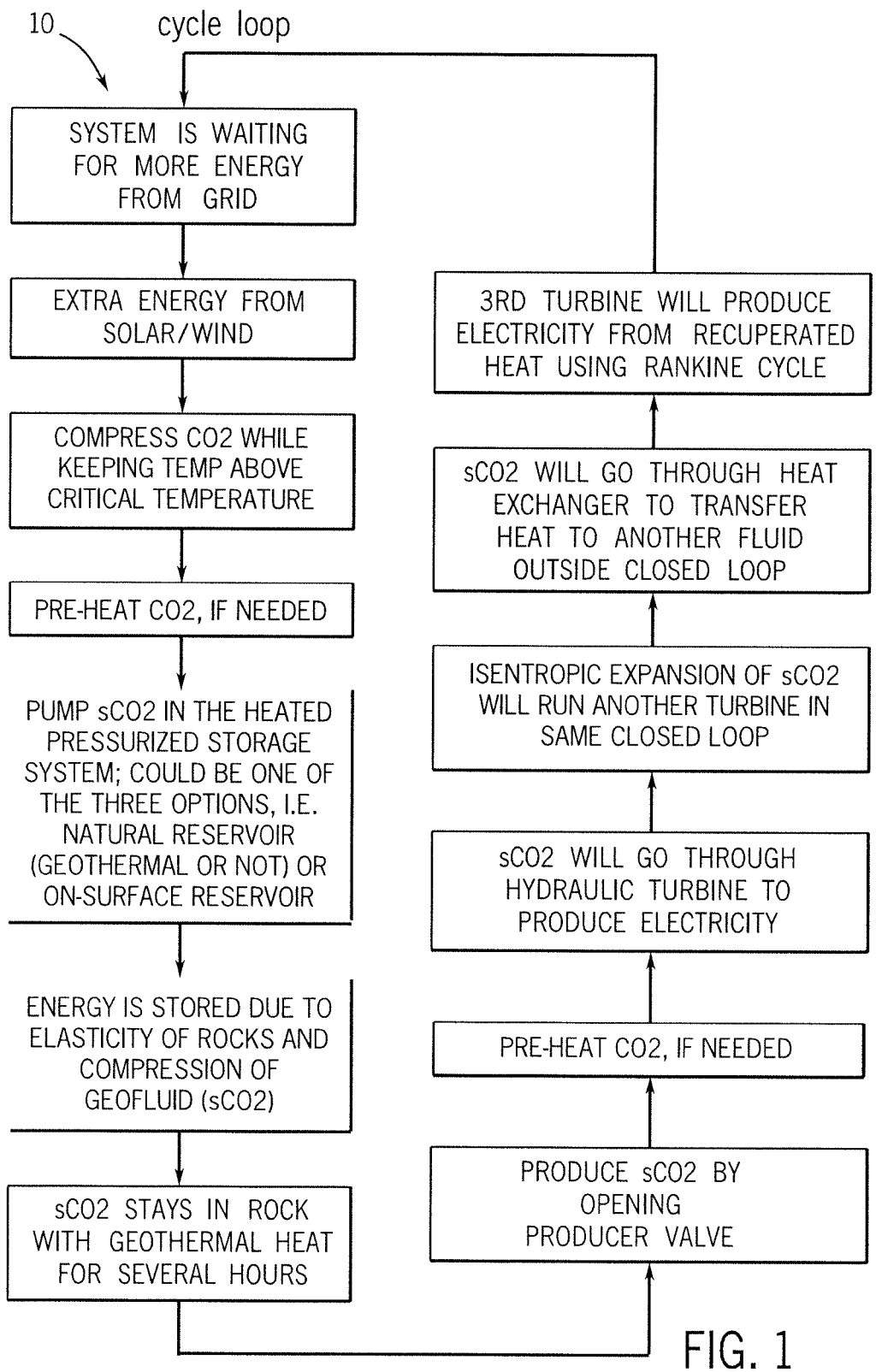
FIG. 1 is a flowchart of a method for generating energy according to an embodiment of the subject technology.

In general, embodiments of the disclosed invention provide integrated carbon-negative, scalable, modular, energy generation and storage. The subject technology produces dispatchable electricity at grid-scale by storing excess energy from the grid. The modularity comes from the fact that the on-surface Energy Conversion plant comprising of systems 22,40,30,28 as shown in FIG. 1 is agnostic to what the storage media is—could be either of subsurface geothermal reservoir, subsurface non-geothermal reservoir, or on-surface, man-made reservoir. The technology also generates its own energy in case of geothermal based subsurface deployment. In some embodiments, excess energy stored from solar and wind may be produced in a deferred method by controlled release on a duration over which electricity production is needed (short to long durations), (for example, from a few hours to several days later), using a carbon-negative technique. Along with storing energy, the subject technology also generates its own energy. In one aspect, the subject technology is energy storage, energy generation, and carbon utilization and sequestration, all in one. The technology has very high round-trip efficiency of storing energy and is carbon-negative which makes it far more sustainable than any competing energy storage technology. Other significant benefits over the competing technologies are: affordability, scalability, modularity, rapid charging capability, long duration storage, long lifetime, and quick startup following load.

By way of example and as shown in FIGS. 1-4, a method 10 and system 20 for generating geo-thermal based energy is shown according to embodiments of the subject technology. Aspects of the subject technology mechanically pump fluid to a subsurface reservoir that is geothermally heated. Excess energy from for example, solar or wind farms, is stored by mechanically pumping fluid down an injection well into a geothermal reservoir. Some embodiments may heat the fluid before injection. Exemplary embodiments may include the use of supercritical carbon-dioxide ($sCO_2$) as a fluid for carrying and storing energy. When needed, energy is produced by depressurizing a production well. The produced fluid initially passes through two turbines to convert kinetic and thermal energy, respectively then through a heat exchanger, transferring heat to a secondary working fluid and driving another turbine, consequently producing additional electricity. This would facilitate electricity generation as needed and in response to load in near real times.

Figure 4:
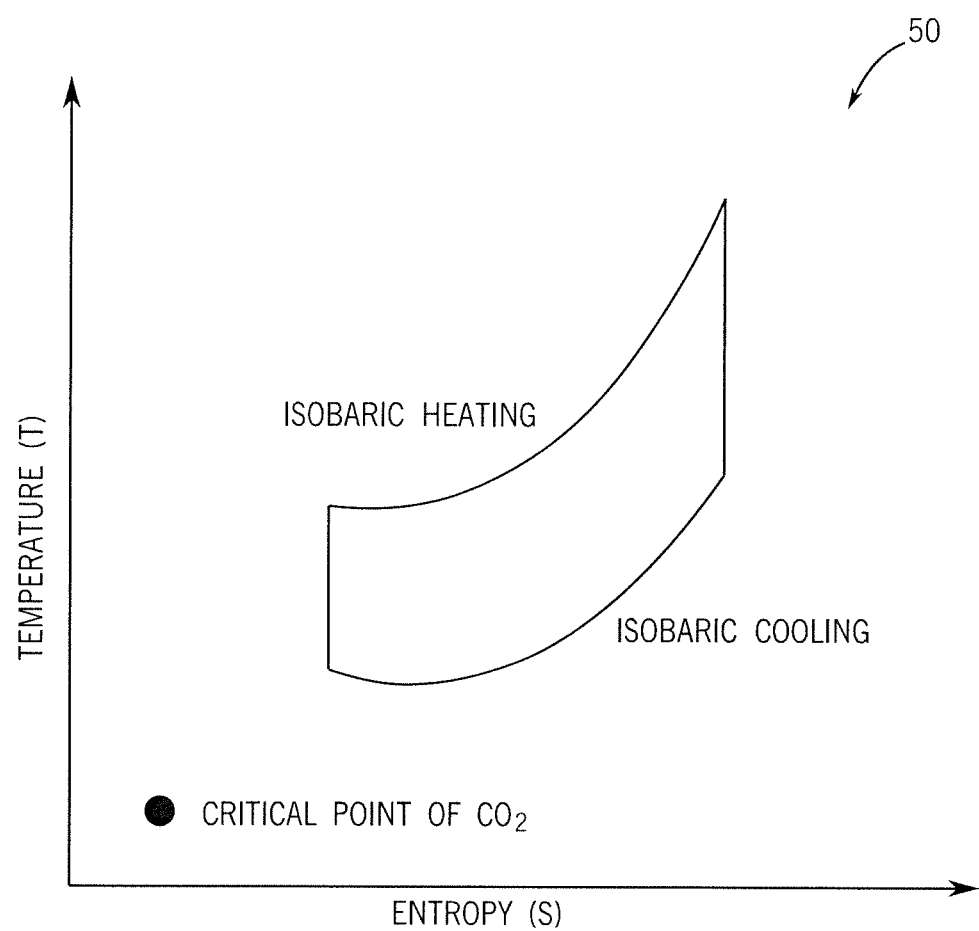
FIG. 4 is a plot of a thermodynamic cycle in accordance with embodiments.

It may be helpful to reference FIG. 4, which shows a thermodynamic cycle, while following steps of the method 10 and referencing elements of the system 20.

Figure 2:
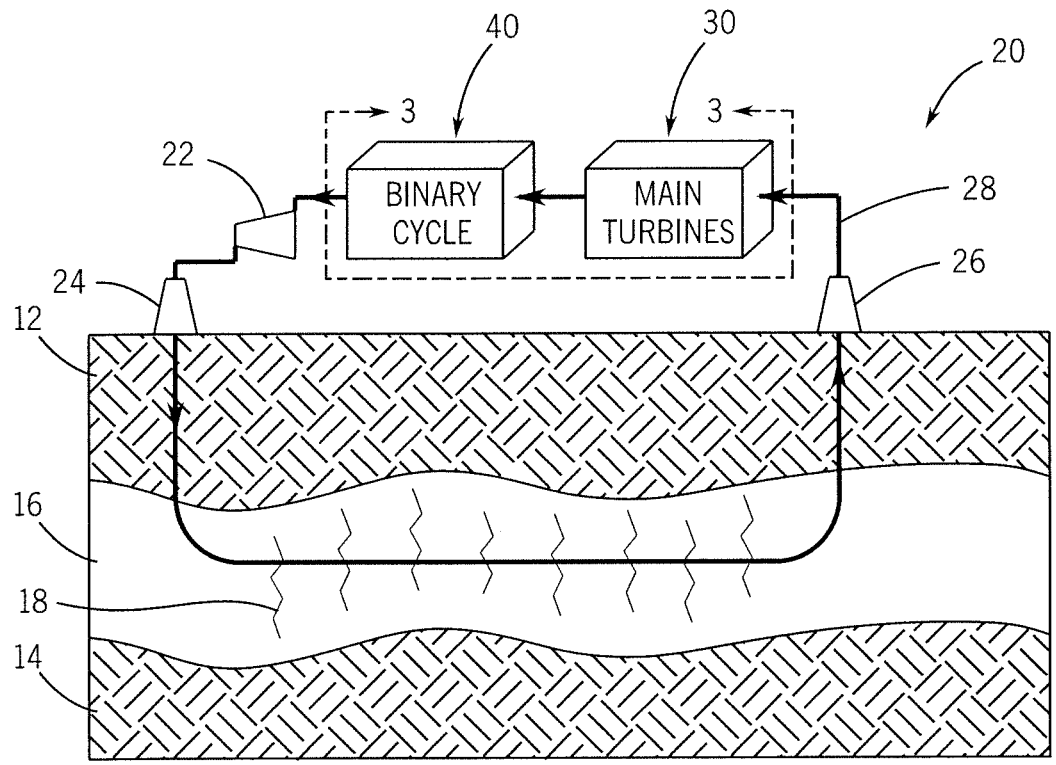
FIG. 2 is a diagrammatic view of an energy generation and storage system according to an embodiment of the subject technology. The underground system in this figure can be replaced with on-surface heated-pressurized storage system
Figure 3:
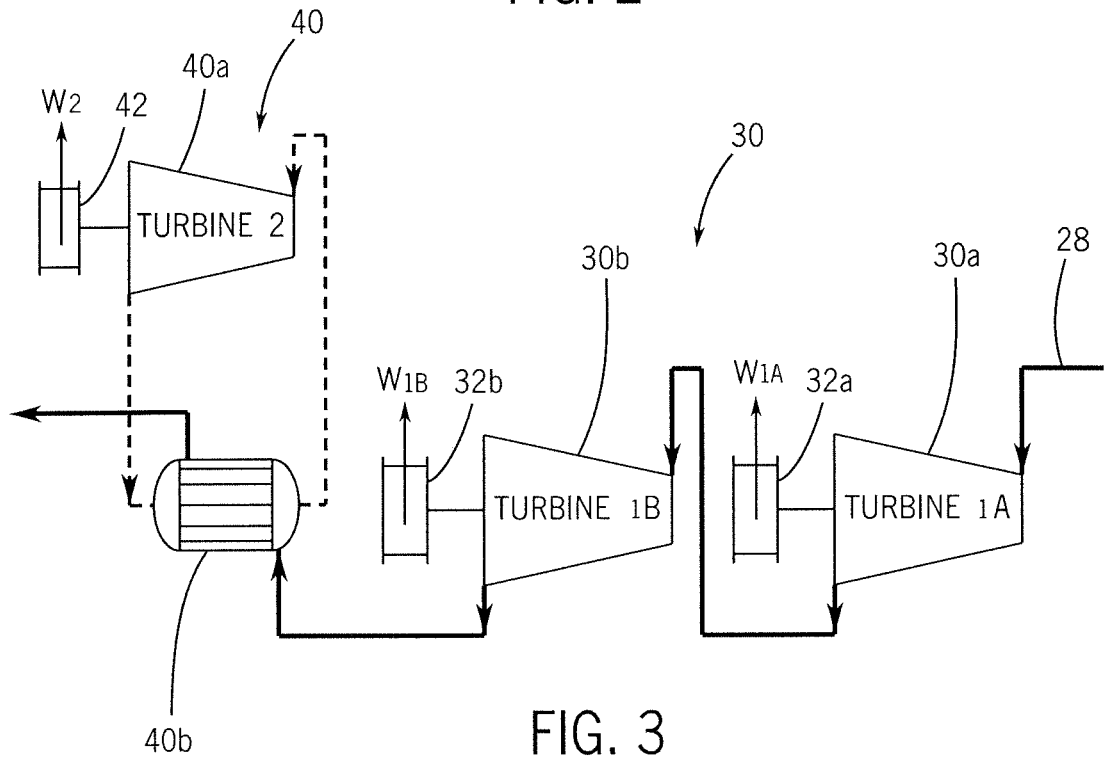
FIG. 3 is an expanded view the section 3 of FIG. 2 according to another embodiment of the subject technology.

Referring now to FIGS. 2 and 3, a system 20 for generating and storing energy is shown according to an exemplary embodiment. The system 20 may generally include first and second stage turbine systems 30 and 40. The first stage turbine system 30 may include a first turbine 30a and a second turbine 30b. The first turbine 30a and the second turbine 30b may operate in a closed loop. The second stage turbine system 40 may include a third turbine 40a and a heat exchanger 40b. An output 42 of the second stage turbine system 40 may be coupled to a compressor 22. Output from the compressor 22 may connect to an injector 24 that is connected to a subsurface geothermal reservoir of subsurface rock formation 16. The geothermal reservoir may be replaced with on-the surface heated-pressurized reservoir. Energy from the formation 16 may be extracted by a producer valve 26 which may be connected to an input end of the turbine system 30. "W1A" and "W1B" represent the work output from turbines 1A and 1B.

In general, a primary fluid is circulated from the turbine systems 30 and 40, into the formation 16 and back to the turbine systems 30 and 40. The circulation is represented by piping path 28. While embodiments are shown circulating the fluid counterclockwise, it will be understood that the elements may be re-arranged and the direction of fluid flow is for illustrative purposes only. However, generally speaking, fluid flow and actions may generally occur with the turbine system 30 before occurring in the turbine system 40. The energy conversion plant elements may be on the surface. The storage media could be either in the subsurface or on the surface. Output from the injector 24 may enter into the sub-surface burden 12. The fluid may be circulated into the target formation 16 where there may be hydraulically induced or natural fractures 18. For a point of reference, a sub-surface underburden generally lies below the target formation 16. Depending on the rock formation reservoir's permeability and extent, pressurized fluid can be contained in geothermally heated rock for extended periods. A minimum residence time is required to heat the fluid in situ. When needed, a production well provides pressurized, heated fluid access to the three turbines.

The first turbine 30a (labeled "Turbine 1A"), may be a hydroelectric style turbine (such as a Pelton/Doble wheel, may have up to efficiency higher than 90%), that converts kinetic energy of the pressured $sCO_2$ fluid (when primary circulating fluid is $sCO_2$) into electricity, circumventing inefficient intermediate thermodynamic or chemical processes, ensuring very low heat losses. The $sCO_2$ character will need to be maintained as it rotates Turbine 1A. The pressure on the surface should not drop below critical pressure of $CO_2$. The outlet of this turbine (1A) is the next turbine's inlet (1B).

The second turbine 30b (labeled "Turbine 1B"), runs by isentropic expansion of the $sCO_2$ in a Brayton cycle (higher thermal efficiencies, >50%). This is demonstrated by steps 1-2 in the T-S plot 50 of FIG. 4. The efficiency of turbine 1B increases monotonically with the cycle's pressure ratio. Consequently, it is necessary to maximize the combined yield of these two turbines 30a and 30b.

The third turbine 40a (labeled as "Turbine 2") is generally outside the closed-loop for turbines 1A and 1B. the third turbine 40a depends on an Organic Rankine cycle (flash vaporization of organic binary fluid) to recuperate waste heat left after the Brayton cycle work output of the turbine system 30.

Referring back now to FIG. 1, a method 10 for generating energy is shown according to an exemplary embodiment. Embodiments of the method may begin with the system 20 waiting for an energy input from the grid. In some embodiments, energy from an external source, for example, excess energy from a solar or wind production source, may be used to power the compressor 22. A primary fluid, for example, carbon dioxide, is compressed to produce supercritical carbon-dioxide ($sCO_2$). The primary fluid is pumped into the subsurface (for example, by injector 24. Potential energy in the compressed fluid is stored using elasticity of the rocks in formation 16. In some embodiments, the primary fluid may stay in the rock formation 16 with geothermal heat for an extended period (for example, hours or days). The primary source of energy storage is compression of sCO2. However, following additional energy storage/generation happens based on the deployment type (subsurface vs. on-surface deployment)

In subsurface deployment, the elasticity in the rock and fractures may allow additional energy storage in form of potential energy. The case of subsurface deployment where the target reservoir for storage is geothermal reservoir, the heat in the rock will generate additional electricity in addition to the electricity from the conversion of stored energy.

For on-surface deployment or non-geothermal subsurface deployment, the other means of storage will be in form of thermal energy where the primary fluid is heated prior to compression using excess energy on the ground. This thermal energy is later recuperated during the process of conversion of stored energy into electricity.

When needed, energy is produced by releasing fluid from production well or depressurizing the heated-pressurized on-surface reservoir. The produced fluid initially passes through two turbines to convert kinetic and thermal energy, then through a heat exchanger, transferring remaining heat to a secondary working fluid and driving another turbine, consequently producing additional electricity. For example, in case of the subsurface deployment, the release of the primary fluid from the rock formation 16 may be controlled by the producer valve 26. The primary fluid will circulate into the turbine system 30. The fluid may operate the first turbine 30a to produce electricity by converting kinetic energy of the fluid to electricity. The fluid may be circulated into the second turbine 30b to generate electricity through isentropic expansion. In some embodiments, the fluid may be circulated into a heat exchanger 40b to transfer heat to another fluid outside the closed loop of the turbine system 30. The binary-cycle, secondary fluid circulated outside the closed loop of turbine system 30 exchanges heat with primary fluid through heat exchanger 40b. This secondary fluid may be circulated to the third turbine 40a to produce electricity from heat recuperated using the Rankine cycle. The primary fluid may then be recirculated throughout the system again as described above after going through a compressor 22.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:
1. A method, comprising:
   compressing a primary fluid;

injecting the compressed primary fluid into a subsurface geo-thermal reservoir or into an on-surface man-made reservoir;

controlling a release of the compressed primary fluid from the subsurface geo-thermal reservoir subsurface geo-thermal or usual reservoir or on-surface man-made reservoir;

circulating the released compressed primary fluid into a first turbine system;

producing electricity by an operation of the first turbine system through energy expended by the compressed primary fluid, wherein the first turbine system includes a first turbine and a second turbine and electricity in the first turbine system is produced by a combination of two turbines, wherein the first turbine runs and produces electricity by converting kinetic energy while the second turbine generates electricity due to isentropic expansion of a primary fluid;

circulating the compressed primary fluid out of the first turbine system and into a heat exchanger;

capturing heat from the heat exchanger as the primary fluid is passed through the heat exchanger; and powering a second turbine system by the heat captured from the heat exchanger using a binary cycle.

2. The method of claim 1, wherein the compressed primary fluid is a supercritical carbon-dioxide.

3. The method of claim 1, further comprising sequestering carbon-dioxide from the sub-surface geo-thermal reservoir.

4. The method of claim 1, further comprising:
circulating the released compressed primary fluid into the first turbine; and
powering the first turbine with the released compressed primary fluid.

5. The method of claim 4, further comprising:
circulating an output of the compressed primary fluid from the first turbine into the second turbine; and
operating the second turbine from the output of the compressed primary fluid from the first turbine.

6. The method of claim 5, wherein the operation of the second turbine is from energy produced by an isentropic expansion of the primary fluid in a Brayton cycle.

7. The method of claim 1, further comprising powering a third turbine in the second turbine system, by energy produced from the captured heat, during a Rankine cycle.

8. The method of claim 1, further comprising storing the compressed fluid in the subsurface geo-thermal reservoir.

9. The method of claim 1, further comprising deferring the controlled release of the compressed fluid from the subsurface geo-thermal reservoir based on a duration over which electricity production is needed.

\* \* \* \* \*